US010503230B2

(12) United States Patent
Joe et al.

(10) Patent No.: US 10,503,230 B2
(45) Date of Patent: Dec. 10, 2019

(54) METHOD AND APPARATUS FOR POWER SCHEDULING

(71) Applicant: Electronics and Telecommunications Research Institute, Daejeon (KR)

(72) Inventors: Hyunwoo Joe, Daejeon (KR); Eunji Pak, Daejeon (KR); Taeho Kim, Gyeonggi-do (KR); Chaedeok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 104 days.

(21) Appl. No.: 15/361,118

(22) Filed: Nov. 25, 2016

(65) Prior Publication Data
US 2017/0149277 A1 May 25, 2017

(30) Foreign Application Priority Data

Nov. 25, 2015 (KR) .......................... 10-2015-0165390
Mar. 30, 2016 (KR) .......................... 10-2016-0038491

(51) Int. Cl.
*G06F 1/00* (2006.01)
*G06F 1/28* (2006.01)
*G06F 1/3234* (2019.01)

(52) U.S. Cl.
CPC .............. *G06F 1/28* (2013.01); *G06F 1/3234* (2013.01); *Y02P 80/11* (2015.11)

(58) Field of Classification Search
CPC ..................................... G06F 1/32; G06F 1/28
See application file for complete search history.

(56) References Cited

U.S. PATENT DOCUMENTS

| 2007/0168747 | A1* | 7/2007 | Konno | G06F 21/6209 714/38.14 |
| 2009/0249354 | A1* | 10/2009 | Yamaguchi | G06F 9/485 718/106 |
| 2011/0145555 | A1* | 6/2011 | Nayar | G06F 1/3203 713/1 |
| 2012/0117350 | A1* | 5/2012 | Bates | G06F 3/0625 711/165 |

(Continued)

FOREIGN PATENT DOCUMENTS

| KR | 10-1529509 B1 | 6/1916 |
| KR | 10-1418488 B1 | 7/2014 |

OTHER PUBLICATIONS

Allen Goldberg et al., "Software Fault Protection with ARINC 653," IEEE Aerospace Conference, 2007, pp. 1-11.

(Continued)

*Primary Examiner* — Mohammed H Rehman
(74) *Attorney, Agent, or Firm* — Staas & Halsey LLP (57) ABSTRACT

Disclosed herein are a method and apparatus for power scheduling. The disclosed method is a power scheduling method of a power-scheduling apparatus for controlling a partition for at least one application, and the method includes setting a power limit for each partition, monitoring the power consumed by each partition in real time, and when power consumption exceeding the power limit is sensed in any partition as a result of monitoring, controlling an operation for the corresponding partition.

18 Claims, 4 Drawing Sheets

(56) References Cited

U.S. PATENT DOCUMENTS

| | | | |
|---|---|---|---|
| 2012/0169584 A1* | 7/2012 | Hwang | H04L 12/2818 |
| | | | 345/156 |
| 2013/0275940 A1 | 10/2013 | Park et al. | |
| 2014/0281606 A1* | 9/2014 | Evans | G06F 1/3268 |
| | | | 713/320 |
| 2014/0372929 A1 | 12/2014 | Park et al. | |
| 2015/0067693 A1* | 3/2015 | Yamazaki | G06F 9/4893 |
| | | | 718/103 |
| 2015/0177814 A1* | 6/2015 | Bailey | G06F 1/3234 |
| | | | 713/320 |
| 2016/0054779 A1* | 2/2016 | Bodas | G06F 1/3203 |
| 2016/0062441 A1* | 3/2016 | Chou | G06F 1/3212 |
| | | | 713/320 |

OTHER PUBLICATIONS

Paul J. Prisaznuk, "ARINC 653 Role in Integrated Modular Avionics (IMA)," IEEE/AIAA 27th Digital Avionics Systems Conference, 2008, 1.E.5-1 through 1.E.5-10.

* cited by examiner

METHOD AND APPARATUS FOR POWER SCHEDULING

CROSS REFERENCE TO RELATED APPLICATIONS

This application claims the benefit of Korean Patent Application No. 10-2015-0165390, filed Nov. 25, 2015, and No. 10-2016-0038491, filed Mar. 30, 2016, which are hereby incorporated by reference in their entirety into this application.

BACKGROUND OF THE INVENTION

1. Technical Field

The present invention relates to a method and apparatus for power scheduling.

2. Description of the Related Art

The ARINC 653 standard provides a specification for an Integrated Modular Avionics (hereinafter, referred to as 'IMA') architecture in which multiple functions can be performed in an integrated manner in a single computer with the improvement of the performance of the computer, in contrast with the existing art, in which a single computer performs only a single function. The ARINC 653 standard is a standard in the avionics field, but recently, research for applying this to various systems is being actively conducted because it is very effective in a system in which safety and reliability are required.

A system in compliance with the ARINC 653 standard defines each application (application software) as a partition and guarantees the independent execution of each partition. Accordingly, one partition does not affect another partition during the execution thereof, and an error occurring in a certain partition does not affect another partition.

However, if power is not smoothly supplied to a specific system, for example, a safety-critical system, an error occurring in a certain partition may propagate to hardware. Therefore, the stable supply of power is very important in such systems. Also, in the case of a system such as a safety-critical system, the safety may be improved when the lifespan of a power supply device (a battery or the like) can be accurately estimated.

However, the existing system intends merely to minimize error by guaranteeing the independence of each partition, and does not consider the power consumed by each partition.

SUMMARY OF THE INVENTION

Accordingly, the present invention has been made keeping in mind the above problem, and an object of the present invention is to provide a method and apparatus for controlling power scheduling for respective partitions in order to improve the reliability of a system to which the ARINC 653 standard is applied.

In order to accomplish the above object, a power scheduling method of a power-scheduling apparatus for controlling a partition for at least one application in a system according to the present invention may include setting a power limit for each partition; monitoring power consumed by the each partition in real time; and when power consumption exceeding the power limit is sensed in any one partition as a result of monitoring, controlling an operation for the any one partition.

Also, in order to accomplish the above object, a power-scheduling apparatus for controlling a partition for at least one application according to the present invention may include a power supply unit for supplying power to each partition; and a control unit for setting a power limit for the each partition, monitoring power consumed by the each partition in real time, and when power consumption exceeding the power limit is sensed in any one partition as a result of monitoring, controlling an operation for the any one partition.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

When describing an embodiment of the present invention, repeated descriptions and descriptions of known functions and configurations which have been deemed to make the gist of the present invention unnecessarily obscure will be omitted below.

It will be understood that the terms "comprises," "may comprise,", and the like used herein specify the presence of stated functions, operations, components and the like, but do not preclude the presence or addition of one or more other functions, operations, components and the like. Also, in the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

In the present specification, a singular expression includes a plural expression unless a description to the contrary is specifically pointed out in context.

Hereinafter, the present invention will be described with reference to the accompanying drawings.

Figure 1:
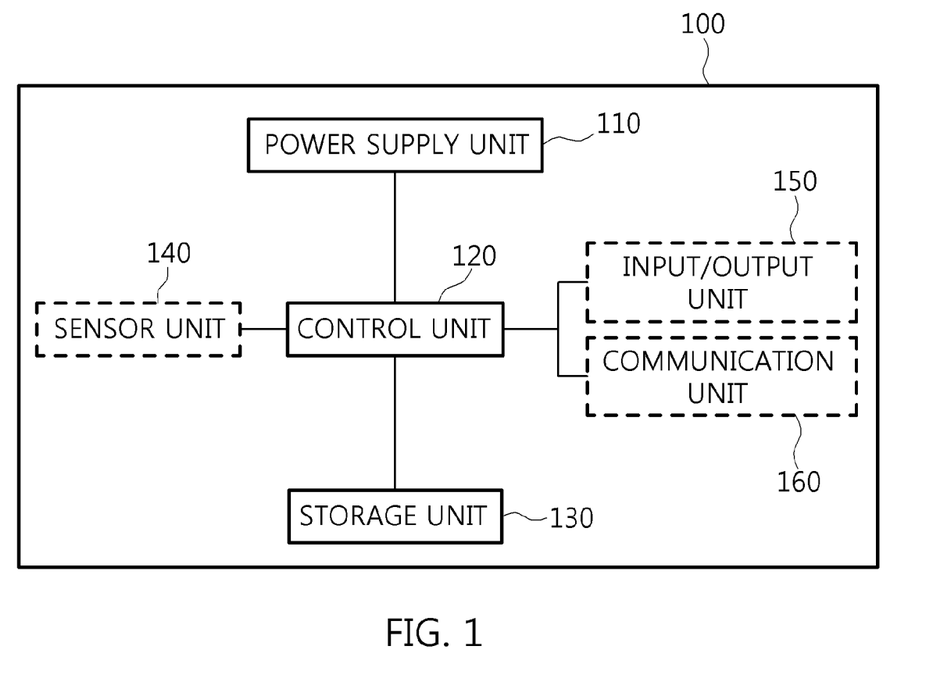
FIG. 1 is a block diagram that shows the components of a power-scheduling apparatus according to the present invention.

FIG. 1 is a block diagram that shows the components of a power-scheduling apparatus according to the present invention.

In various embodiments of the present invention, a power-scheduling apparatus 100 is an apparatus to which the ARINC 653 standard is applied, and may be, for example, a safety-critical system.

A safety-critical system means a computer, electrical or electronic system the failure of which may result in serious damage to people. Safety-critical systems are applied in fields closely related to people's lives, such as the automotive field, the aerospace field, the factory automation field, the railway field, the nuclear power control field, the field of medical facilities, the national defense field, and the like.

Accordingly, safety-critical systems are characterized in that the stable operation thereof is regarded as the top priority in connection with the safety of society and people.

A safety-critical system is a real-time system in which the execution of a task must be completed within a limited time period. That is, the execution of an application must be completed by a deadline, or the execution of a certain task by an application must be completed by a deadline.

Also, in order to prevent an error from propagating, that is, in order for interruption of the execution of a certain application to avoid affecting the execution of another application, the safety-critical system must separately allocate execution time to respective applications, so that the applications may independently use the time allocated thereto. Furthermore, the safety-critical system must divide the memory area in which applications are executed, so that applications cannot trespass on each other's memory area.

Such a time/space partitioning technique of a safety-critical system may be implemented by applying the ARINC 653 standard.

The ARINC 653 is a standard interface specification used for an avionics system, which is a representative safety-critical system, and it comprises an API specification for a real-time operating system. The ARINC 653 defines APplication EXecutive (APEX), which is an interface between an operating system and an application running thereon.

Figure 2:
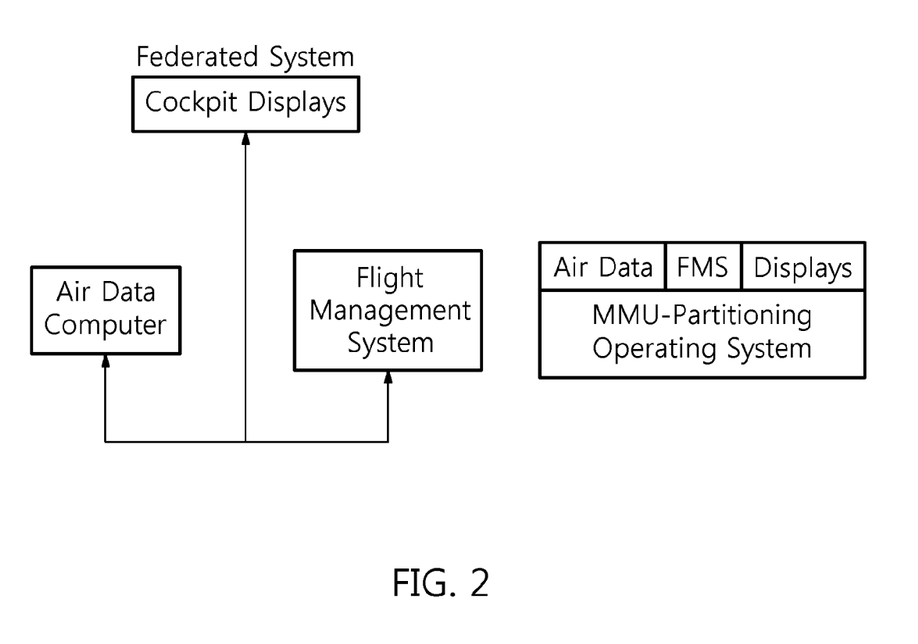
FIG. 2 is a view for describing an Integrated Modular Avionics (IMA) system.

The ARINC 653 standard is proposed for IMA. IMA provides a platform in which applications, which were executed on distributed systems according to an existing federated system structure, are integrated into a single high performance processor-based system, as illustrated in FIG. 2. IMA integrates multiple existing modules (electronic devices) into a single computing device, and thereby enables the reduction of the size and weight of the whole system and the reduction of power consumption.

However, IMA in the form of an integrated platform entails the possibility of an error in an application being propagated to the entire system. Accordingly, methods for guaranteeing the independence of each application have been actively researched in order to prevent error propagation between applications, and the ARINC 653, which is a standard specification for an interface between a real-time OS for an avionics system and applications, has been specified.

The ARINC 653 standard introduces the concept of a time/space partition in order to guarantee strong independence between applications. Here, a single module for performing a single function, to which the ARINC 653 standard is applied, is defined as a partition, and when multiple partitions are executed together, the partitions are separate from each other temporally and spatially and thus do not affect each other. Specifically, each of the partitions individually executes its task at the time appointed according to a system configuration, whereby temporal independence is guaranteed. Also, because each of the partitions executes its task using only an independent memory area allocated thereto, spatial independence is guaranteed.

The above-described ARINC 653 standard is a standard for the avionics field and is highly effective in a system in which safety and reliability are required, but has recently come to be applied to various systems with the development of hardware and the generalization of multicore hardware. The system to which the ARINC 653 standard is applied defines each application (application software) as a single partition and guarantees temporal and spatial independence between partitions. That is, partitions do not affect each other while they are being executed, and an error occurring in a certain partition does not affect the execution of another partition.

The power-scheduling apparatus 100 according to the present invention is an apparatus for supporting a system to which the above-described ARINC 653 standard is applied, and may define each application as a partition and operate partitions so as to be temporally and spatially separate from each other.

A system to which the ARINC 653 standard is applied, such as a safety-critical system, may require the consistent supply of power for the stable operation of partitions in addition to time/space partitioning. Unless sufficient power is supplied to each of the partitions, an error may occur in a certain partition or the entire system.

Therefore, the power-scheduling apparatus 100 according to the present invention controls the amount of power to be consumed for each of the partitions.

Referring to FIG. 1, the power-scheduling apparatus 100 according to the present invention may include a power supply unit 110, a control unit 120, and a storage unit 130.

The power supply unit 110 may receive internal or external power and supply power required for operation to the components of the power-scheduling apparatus 100. Specifically, the power supply unit 110 may supply power to at least one partition under the control of the control unit 120.

The control unit 120 may include one or more processors and serves to operate a system. In an embodiment, the control unit 120 may perform control operation in compliance with the ARINC 653 standard in order to operate the system.

Specifically, the control unit 120 defines each application as a partition, and may schedule the execution of a partition and tasks executed in the partition. The control unit 120 may schedule the execution of a partition and the use of a core for execution, in order to guarantee temporal and spatial independence between partitions. That is, the control unit 120 may appoint, in advance, the time at which each partition is to be executed according to scheduling, and may assign a core to each partition for execution thereof.

For example, the control unit 120 executes only a single partition in any time slot, but may schedule tasks within the partition so as to be simultaneously executed by multiple cores in order to make better use of the multicore resources (symmetric type). Alternatively, the control unit 120 may schedule tasks of multiple partitions so as to be executed by different cores in any time slot (asymmetric type).

When scheduling tasks, the control unit 120 may consider the priority order set for each of the tasks.

In various embodiments of the present invention, the control unit 120 may control the components of the power-scheduling apparatus 100 in order to perform a power scheduling method.

Specifically, the control unit 120 sets the maximum amount of power available for each partition (application), that is, a power limit, measures power consumed by each partition in real time, and performs control in order to prevent the real-time consumption of power by each partition from exceeding the preset power limit. Accordingly, the control unit 120 may prevent the occurrence of an error that may arise from power shortage in a partition when another partition consumes excessive power.

In various embodiments of the present invention, the control unit 120 may perform initial setup for the above-mentioned power scheduling. The control unit 120 may determine the total amount of power that the power supply unit 110 can supply to the entire system and the amount of instantaneous power. Also, the control unit 120 may determine the amount of power required for the execution of a task for each partition.

Figure 3:
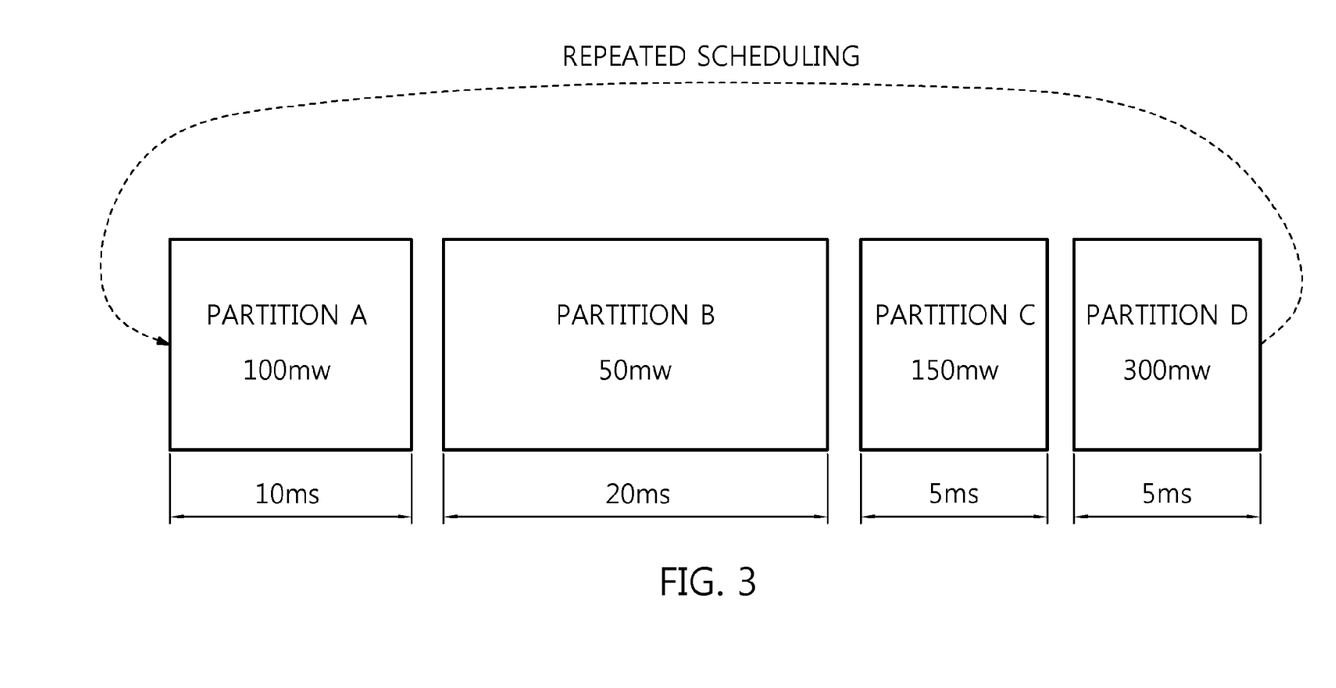
FIG. 3 is a view that shows an example in which a power limit is set for each partition according to the present invention.

The control unit 120 presets a power limit for each partition based on the determined total amount of power that can be supplied, the amount of instantaneous power that can be supplied, and the amount of power required for each partition, as shown in FIG. 3. The control unit 120 may set the power limit depending on task scheduling of each partition. Specifically, when the execution of a task of a partition is scheduled for a specific time and a specific space (i.e. a specific core or a specific area of a specific core) in the state in which temporal and spatial independence between partitions is guaranteed, the control unit 120 may set the power limit, which is the amount of power available at the corresponding time and in the corresponding space, as shown in FIG. 3.

The power limit may be set using the information determined through any algorithm or equation, and there is no limitation as to the algorithm or equation.

In various embodiments of the present invention, the control unit 120 may monitor the power consumed by each partition in real time.

In an embodiment, the control unit 120 may monitor the power consumed by each partition using a sensor. In this case, the power-scheduling apparatus 100 may further include a sensor unit 140.

The sensor unit 140 may sense the power consumption state of each partition and deliver information about the power consumption based on the sensed power consumption state to the control unit 120.

To this end, the sensor unit 140 may include at least one of a current measurement sensor and a power measurement sensor. The sensor unit 140 may measure the current or power consumed by each partition or each of the components of the power-scheduling apparatus 100 in real time using the sensor. The sensor unit 140 delivers information about the measured current or power consumption to the control unit 120, so that the control unit 120 may determine the power consumed by each partition.

The power consumption state has been described as being sensed using the sensor unit 140, but this is merely an embodiment, and the power consumption state may be sensed by measuring current or power through various software methods.

Alternatively, in an embodiment, the control unit 120 may monitor power consumption by sensing an event. The event used to measure power consumption is related to an operation that can change power consumption, for example, an input/output event related to an input or output operation or a communication event related to sending or receiving data. The input/output event may include, for example, an input event for controlling turning on or off the power-scheduling apparatus 100 or an input event for controlling a power consumption mode (for example, control for switching between a standby mode, a sleep mode, and an active mode).

In this case, the power-scheduling apparatus 100 may further include at least one of an input/output unit 150 and a communication unit 160.

The input/output unit 150 may include at least one input module for generating an input signal in response to user input or using an external device. The input module may be configured with a key pad, a dome switch, a touch pad (static pressure type/electrostatic type), a jog wheel, a jog switch, and the like. Alternatively, the input module may include a switch, a circuit, and the like for communicating with an external device. Also, the input/output unit 150 may include at least one output module for outputting information about the power-scheduling apparatus 100 or an apparatus having the power-scheduling apparatus 100 as a component thereof. The output module may be configured with a display, a sound output unit, a lighting unit and the like. Alternatively, the output module may include a switch, a circuit, and the like for communicating with an external device.

The communication unit 160 may send and receive data to and from the outside by performing wired and wireless communication. To this end, the communication unit 160 may include at least one of a wired/wireless communication module and a short-range communication module.

When an input/output event or a communication event occurs, the input/output unit 150 or the communication unit 160 delivers information about the event to the control unit 120. The control unit 120 may determine the power consumed by each partition based on the information about the event.

The above-described event is merely an example, and the control unit 120 may determine the power consumed by each partition based on previously stored information about power consumption corresponding to an event when various types of hardware of the power-scheduling apparatus 100 are controlled in a software manner.

In various embodiments, when power consumption is determined based on an event, the control unit 120 stores, in advance, information about power consumed by a partition in connection with at least one event, and may determine the power consumed by a partition using the stored information when a certain event occurs.

The control unit 120 monitors power consumption. If the power consumed by any partition exceeds a preset power limit thereof, the control unit 120 prevents the use of power in order to avoid exceeding the power limit by controlling the execution of the corresponding partition.

For example, when the power consumed by any one partition exceeds the preset power limit, the control unit 120 may forcibly terminate or interrupt the execution of the corresponding partition, or may prevent the power supply unit 110 from supplying power to the corresponding partition. However, this is merely an example, and there is no limitation as to the operation of the control unit 120 for controlling the power consumption.

In various embodiments of the present invention, when the power consumption in any one partition is equal to or less than the preset power limit, the control unit 120 may monitor the remaining amount of power, which is the difference between the preset power limit and the power consumption. After that, when an additional amount of power exceeding the preset power limit is required in the corresponding partition, the control unit 120 may allocate the remaining amount of power to the corresponding partition rather than controlling the execution of the corresponding partition.

In this embodiment, because the control unit 120 separately manages the remaining amount of power for respective partitions, the power consumed by a partition may not affect the power consumed by another partition.

The storage unit 130 may include various pieces of information for power scheduling under the control of the control unit 120. Specifically, the storage unit 130 may store information about task scheduling for each partition, information about a power limit set for each partition, and the like, or may store information about power consumption corresponding to some event.

Figure 4:
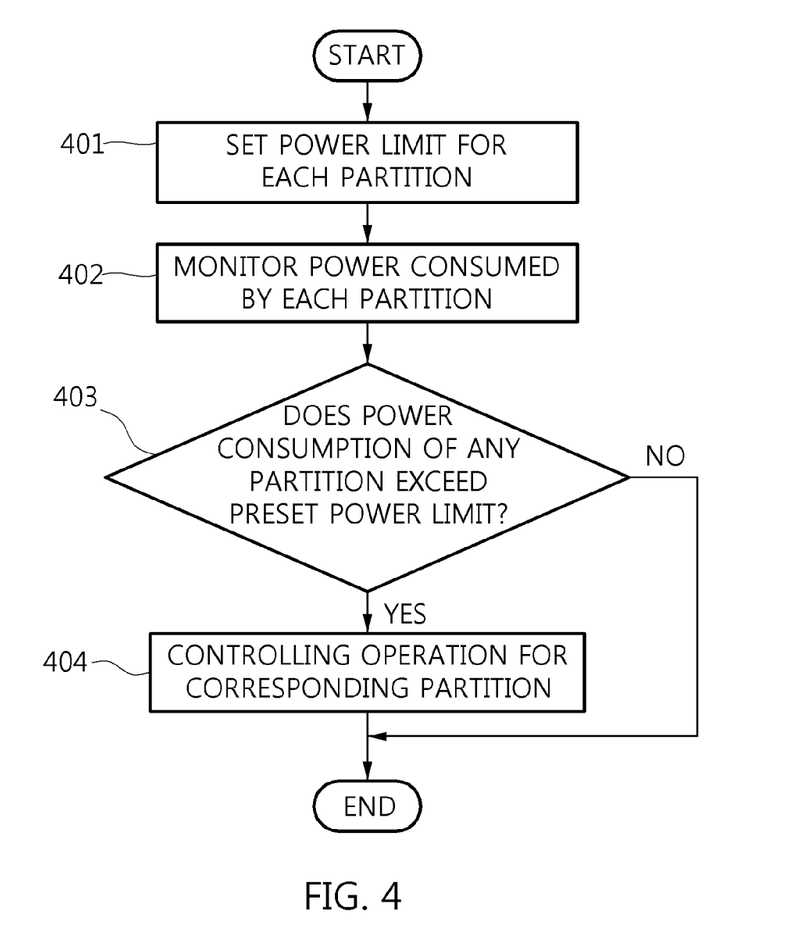
FIG. 4 is a flowchart that shows a power scheduling method according to the present invention.

FIG. 4 is a flowchart that shows a power scheduling method according to the present invention.

Referring to FIG. 4, first, the power-scheduling apparatus 100 according to the present invention sets a power limit for each partition at step 401.

The power-scheduling apparatus 100 may determine the total amount of power that can be supplied to the entire system and the amount of instantaneous power. Also, the power-scheduling apparatus 100 may determine the amount of power required for executing a task in each partition.

The power-scheduling apparatus 100 presets a power limit for each partition based on the determined total amount of power that can be supplied, the determined amount of instantaneous power, and the amount of power required for each partition. The power-scheduling apparatus 100 may set the power limit depending on the task scheduling of each partition. Specifically, when the execution of a task of a partition is scheduled for a specific time and a specific space (i.e. a specific core or a specific area of a specific core) in the state in which temporal and spatial independence between partitions is guaranteed, the power-scheduling apparatus 100 may set the power limit, which is the amount of power available at the corresponding time and in the corresponding space.

The power limit may be set using the information determined through any algorithm or equation, and there is no limitation as to the algorithm or equation.

Subsequently, the power-scheduling apparatus 100 monitors the power consumed by each partition at step 402.

In an embodiment, the power-scheduling apparatus 100 may monitor the power consumed by each partition using a sensor. The power-scheduling apparatus 100 may receive information about the power consumed by each partition from at least one sensor, and may determine the power consumed by each partition based on the received information. For example, the power-scheduling apparatus 100 may determine the power consumed by each partition by receiving information about the amount of current or power consumed in each partition from at least one sensor.

In an embodiment, the power-scheduling apparatus 100 may monitor the power consumption by sensing an event. The event used to measure power consumption is related to an operation that can change power consumption, such as an input/output event related to an input or output operation, a communication event related to sending or receiving data, and the like. The input/output event may include, for example, an input event for controlling turning on or off the power-scheduling apparatus 100 or an input event for controlling a power consumption mode (for example, control for switching between a standby mode, a sleep mode, and an active mode).

The above-described event is merely an example, and the power-scheduling apparatus 100 may determine the power consumed by each partition based on previously stored information about power consumption corresponding to an event when various types of hardware of the power-scheduling apparatus 100 are controlled in a software manner.

In various embodiments, when power consumption is determined based on an event, the power-scheduling apparatus 100 stores, in advance, information about the power consumed by a partition in connection with at least one event, and may determine the power consumed by a partition using the stored information when a certain event occurs.

The power-scheduling apparatus 100 determines at step 403 whether the power consumed by any one partition exceeds a preset power limit by monitoring the power consumption.

When it is determined that power consumption exceeding the power limit is sensed in any partition, the power-scheduling apparatus 100 controls the execution of the corresponding partition at step 404.

For example, if the power consumed by any one partition exceeds the preset power limit, the power-scheduling apparatus 100 may forcibly terminate or interrupt the execution of the corresponding partition, or may prevent power from being supplied to the corresponding partition. However, this is merely an example, and there is no limitation as to the operation of the power-scheduling apparatus 100 for controlling power consumption.

In various embodiments of the present invention, when the power consumption in any one partition is equal to or less than the preset power limit, the power-scheduling apparatus 100 may monitor the remaining amount of power, which is the difference between the preset power limit and the power consumption. After that, when an additional amount of power exceeding the preset power limit is required in the corresponding partition, the power-scheduling apparatus 100 may allocate the remaining amount of power to the corresponding partition rather than controlling the execution of the corresponding partition.

In this embodiment, because the power-scheduling apparatus 100 separately manages the remaining amount of power for respective partitions, the power consumed by a partition may not affect the power consumed by another partition.

The power-scheduling apparatus 100 may control the power scheduling by repeatedly performing the above-described operation as long as the turned-on state of the power-scheduling apparatus 100 is maintained.

The method and apparatus for power scheduling according to the present invention enable a system to operate stably by consistently supplying constant power to respective partitions while the system is driven.

The method and apparatus for power scheduling according to the present invention set the maximum lifespan of the entire system or respective partitions in advance, whereby it is possible to prevent an error that may occur when power is in short supply while a certain task is being executed, or an error that may occur when the instantaneous supply of power is insufficient. Also, the method and apparatus for power scheduling according to the present invention may extend a time period for executing a certain task because the consumption of battery power is known in advance, and may enable a main task and a task subsidiary thereto to be processed together depending on the consumption of battery power when a task execution time is limited, whereby stability and productivity may be improved.

The method and apparatus for power scheduling according to the present invention relate to the distribution of power to be consumed by respective partitions, which was overlooked in the ARINC standard, and based on this, a safety-critical system having high reliability may be developed. Therefore, the method and apparatus may have high applicability when the specification is applied.

The above description merely illustrates the technical spirit of the present invention, and those skilled in the art may make various changes and modifications without departing from the scope of the present invention.

Accordingly, the embodiments, having been disclosed in the present invention, are intended not to limit but to describe the technical spirit of the present invention, and the scope of the technical spirit of the present invention is not limited to the embodiments. The scope of protection of the present invention must be interpreted based on the accompanying claims, and all the technical spirit in the same range as the claims must be interpreted as being included in the scope of rights of the present invention.

What is claimed is:

1. A power scheduling method of a power-scheduling apparatus, comprising:
by at least one hardware processor:
setting power limits specifying amounts of power available for partitions, respectively, to execute applications independent of each other according to the set power limits, the setting of power limits including specifying a first maximum amount of power available for a first partition among the partitions for a first time period and a first memory space, and a second maximum amount of power available for a second partition among the partitions for a second time period and a second memory space;
monitoring a first power consumption of the first partition and a second power consumption of the second partition in real time while a first application and a second application among the applications execute within the first partition and the second partition, respectively; and
controlling power scheduling for at least one of the first partition and the second partition, in response to one of the first power consumption exceeding the first maximum amount of power available for the first partition and the second power consumption exceeding the second maximum amount of power available for the second partition,
wherein, among the partitions, the controlling forcibly terminates or interrupts an operation of the first partition and/or the second partition, or prevents power from being supplied to the first partition and/or the second partition without changing both the first time period and the second time period and the first memory space and the second memory space, to thereby avoid an error from occurring in remaining partitions.

2. The power scheduling method of claim 1, wherein setting the power limits comprises:
determining a total amount of power suppliable to a system including the partitions and an amount of instantaneous power;
determining an amount of power necessary to execute the first application and the second application in the first partition and the second partition, respectively; and
setting the first maximum amount of power available for the first partition and the second maximum amount of power available for the second partition based on the determined total amount of power, the determined amount of instantaneous power, and the determined necessary amount of power for the first application and the second application.

3. The power scheduling method of claim 1, wherein setting the power limit comprises:
scheduling the first application corresponding to the first partition, and the second application corresponding to the second partition; and
setting, the first maximum amount of power available for the first partition for the first time period and the first memory space, and the second maximum amount of power available for the second partition for the second time period and the second memory space, according to the scheduled first application and the second application to execute within the first partition and the second partition for the first time period and the second time period and for the first memory space and the second memory space, respectively.

4. The power scheduling method of claim 1, wherein monitoring the power consumption comprises:
receiving information about a power consumption of the partitions, respectively; and
determining the power consumption of the partitions, respectively, based on the received information.

5. The power scheduling method of claim 4, wherein the information about the power consumption includes any one or combination of a current consumption and a power consumption.

6. The power scheduling method of claim 1, wherein monitoring the power consumption comprises:
sensing at least one event occurring in the first partition and the second partition, respectively; and
determining the power consumption of the first partition and the second partition, respectively, based on previously stored information about power consumption corresponding to the at least one event.

7. The power scheduling method of claim 6, wherein the at least one event includes any one or combination of an input/output event and a communication event related to sending and receiving data.

8. The power scheduling method of claim 1, further comprising:
managing, when a power consumption for a partition among the partitions is equal to or less than a power limit among the power limits, a difference between the power consumption corresponding to the partition and the power limit sensed as a remaining amount of power for the partition,
wherein the controlling of the power scheduling comprises scheduling the remaining amount of power for the partition.

9. A power-scheduling apparatus, comprising:
a power supply to supply power to partitions to execute applications independent of each other according to set power limits for the partitions, respectively; and
a controller to:
set power limits including specifying a first maximum amount of power available for a first partition among the partitions for a first time period and a first memory space, and a second maximum amount of power available for a second partition among the partitions for a second time period and a second memory space, respectively,
monitor a first power consumption of the first partition and a second power consumption of the second partition in real time while a first application and a second application among the applications execute within the first partition and the second partition, respectively, and
controlling power scheduling for at least one of the first partition and the second partition, in response to one of the first power consumption exceeding the first maximum amount of power available for the first partition and the second power consumption exceeding the and the second maximum amount of power available for the second partition,
wherein, among the partitions, the controller performs a control so as to forcibly terminate or interrupt the operation for the partition, or to prevent power from being supplied to first partition and/or the second partition without changing both the first time period and the second time period and the first memory space and the second memory space, to thereby avoid an error from occurring in remaining partitions.

10. The power-scheduling apparatus of claim 9, wherein the controller,
determines a total amount of power suppliable to a system including the partitions and an amount of instantaneous power,
determines an amount of power necessary to execute the first application and the second application in the first partition and the second partition, respectively, and
sets the first power consumption exceeding the first maximum amount of power available for the first partition and second power consumption exceeding the second maximum amount of power available for the second partition based on the determined total amount of power, the determined amount of instantaneous power, and the determined necessary amount of power for the first applications and the second application.

11. The power-scheduling apparatus of claim 10, wherein the system uses the ARINC 653 standard.

12. The power-scheduling apparatus of claim 10, wherein the system is a safety-critical system.

13. The power-scheduling apparatus of claim 9, wherein the controller,
schedules the first application corresponding to the first partition, and the second application corresponding to the second partition, and
sets the first the first power consumption exceeding the first maximum amount of power available for the first partition for the first time period and the first memory space, and the second power consumption exceeding the second maximum amount of power available for the second partition for the second time period and the second memory space, according to the scheduled first application and the scheduled second application to execute within the first partition and the second partition for the first time period and the second time period and the first memory space and the second memory space, respectively.

14. The power-scheduling apparatus of claim 9, wherein the controller determines power consumption of the partitions based on information about power consumption received when a power consumption state is sensed, respectively.

15. The power-scheduling apparatus of claim 14, wherein the information about the power consumption includes any one or combination of a current consumption and a power consumption.

16. The power-scheduling apparatus of claim 9, wherein the controller senses at least one event occurring in the partitions, respectively, and
determines the power consumption of the partitions, respectively, based on previously stored information about power consumption corresponding to the at least one event.

17. The power-scheduling apparatus of claim 16, further comprising:
at least one of an input/output device to sense an input/output event in the first and second partitions and a communication device to sense a communication event in the first and second partitions related to sending and receiving data,
wherein to determine the power consumption of the first and second partitions, the controller senses at least one of the input/output event or the communication event through the at least one of the input/output device and the communication device.

18. The power-scheduling apparatus of claim 9, wherein, when a power consumption, for a partition among the partitions, is equal to or less than a power limit among the power limits, the controller manages a difference between the power consumption corresponding to the partition and the power limit sensed as a remaining amount of power for the partition, and
the controller schedules the remaining amount of power for the partition.

* * * * *